United States Patent Office 2,945,061
Patented July 12, 1960

2,945,061
PROCESS FOR THE PRODUCTION OF BIGUANIDE DERIVATIVES CONTAINING ACTIVE CHLORINE

Valentin Habernickel, Bergheim, Sieg, Germany, assignor to Henkel & Cie, G.m.b.H., Dusseldorf-Holthausen, Germany, a corporation of Germany No Drawing. Filed May 19, 1959, Ser. No. 814,139

Claims priority, application Germany Jan. 7, 1954

10 Claims. (Cl. 260—551)

This invention relates to the production of biguanide derivatives containing available active chlorine, and more particularly to N-chlorinated-substituted biguanides produced by chlorinated substituted biguanide salts with hypochlorous acid.

N,N'-dichloro-azodicarbon-diamidine which is derived from guanidine and has the following structural formula $$H_2N-C-N=N-C-NH_2$$
$$\|\qquad\qquad\|$$
$$NCl\qquad\quad NCl$$

has a high available active chlorine content; its practical application as a chlorinating agent, however, is limited by its low solubility in water.

It is an object of the present invention to provide a series of organic compounds with a high available active chlorine content which are freely soluble in water and various organic solvents.

It is another object of the present invention to provide a simple and effective process for producing stable and freely water-soluble organic compounds having a high available active chlorine content.

Other objects and advantages of the present invention will become apparent as the description proceeds.

I have found that active chlorine can be introduced into alkylated biguanides, and that the products thus obtained are readily water-soluble and at the same time have a high available active chlorine content.

The starting materials for the production of the products in accordance with this invention are N-substituted biguanides having the general structural formula

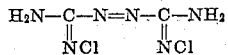

wherein $R_1$, $R_2$, $R_3$ and $R_4$ are selected from the group consisting of hydrogen and aliphatic radicals. If $R_1$, $R_2$, $R_3$ and $R_4$ include more than one organic radical, these radicals may be identical or different. Preferred, however, are di- or tetra-substituted biguanides. In the case of di-substituted biguanides, the two substituent radicals are preferably attached to the same nitrogen atom.

The literature describes the production of substituted biguanides; for example, it is described by Curd, Journal of the Chemical Society, London, 1946, pages 364 and 729; and 1948, page 1630. It is also described by Slotta and Tschesche in "Berichte der Deutschen Chemischen Gesellschaft," vol. 62, 1929, pages 1390, 1398 and 1402. These compounds are obtained by reacting primary or secondary amines with dicyandiamide in accordance with the formula

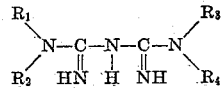

The substituted biguanides are obtained in the form of their salts. They can be separated from unreacted components of the reaction mixture by dissolving them in water. Their solubility in water decreases with the size and number of the substituent organic radicals attached to the molecule. Radicals $R_1$, $R_2$, $R_3$ and $R_4$ should altogether contain no more than 10 carbon atoms. These may be present in one of the said organic radicals. It is preferred to employ primarily those compounds as starting materials which contain aliphatic radicals with no more than 4 carbons atoms. These radicals are preferably hydrocarbon radicals, but they may also be radicals substituted by heteroatoms and heteroatom-containing groups, especially those which do not decrease the alkalinity of the amine used in the production of the substituted biguanides. A good solubility of the substituted biguanides in water is, however, not a necessary prerequisite for practicing the present process; biguanides which contain higher organic radicals and which are relatively insoluble in water may be reacted with hypochlorous acid in aqueous suspension. With decreasing solubility of the substituted biguanides, however, it becomes more difficult to separate the N-chlorinated reaction product from the unreacted components of the reaction mixture, for example from dicyandiamide; this cannot be regarded as a disadvantage, however, because dicyandiamide is also capable of taking up chlorine. For this reason, residual quantities of unreacted dicyandiamide may remain in the reaction mixture, even if its separation from the highly soluble substituted biguanides is readily possible. For the chlorination of raw, unpurified substituted biguanides, the process according to the present invention is substantially simplified in that it is not necessary to provide a separate purification operation; the chlorinated substituted biguanides obtained in this manner are technically completely equivalent to products produced from purified starting materials.

In practicing the process according to the present invention, the substituted biguanides, in the form of their salts, are put into acid aqueous solution or suspension and brought into intimate contact with hypochlorous acid. If the starting material is a salt formed by a substituted biguanide with a strong acid, such as hydrochloric acid or sulfuric acid, their aqueous solutions react sufficiently acid so that one may immediately proceed with the reaction. However, even in this case it is recommended to add an excess of acid to the solution. If the hypochlorous acid is formed in the reaction mixture by introducing chlorine into the solution, hydrochloric acid is formed by hydrolysis of the chlorine. If the biguanides to be reacted are available as free bases, however, a sufficient amount of acid must be added to the water so that the solution still reacts acid even after the corresponding biguanide salt is formed. For example, the amount of glacial acetic acid which must be added to the solution or suspension of the biguanide base must be at least equivalent to the amount of biguanide base originally present. In place of glacial acetic acid, other stronger acids may also be used, especially formic, hydrochloric or sulfuric acid.

The hypochlorous acid necessary for chlorinating the biguanide is preferably formed by introducing chlorine into the biguanide solution. It may, however, also be formed in accordance with other known processes; for example, by a reaction of sodium hypochloride with strong acids, such as hydrochloric acid or sulfuric acid, or also by introducing gaseous hypochlorous acid produced in known manner from calcium chloride and carbon dioxide into the aqueous solution or suspension of the substituted biguanide. In all cases, care should be taken that the reaction of the reaction solution is always distinctly acid. If the substituted biguanides are chlorinated by introducing chlorine into an aqueous solution of their salts, the pH-value decreases gradually as the chlorination proceeds unless the solution was not made strongly acid at the beginning. The pH-value which is most favorable for chlorination must be maintained, and this value ordinarily lies between 3 and 5. The control of the pH value is readily achievable with the aid of glass electrodes.

The degree of chlorination of the biguanide compound is influenced not only by the amount of hypochlorous acid employed, but also by the prevailing temperature. At temperatures between 0 and 10° C., and preferably between 5 and 10° C., it is preferred to introduce one chlorine atom into the substituted biguanide. With increasing temperature the degree of chlorination increases and more and more of the dichloro derivative is formed. The formation of the dichloro derivative may not be entirely avoided even at lower temperatures. In order to produce a complete chlorination, the temperature is advantageously increased to 18 to 20° C.; temperatures above 30° C. should not be employed because the capability of the solution to absorb chlorine becomes too small and the hypochlorous acid formed in the solution begins to decompose.

The chlorinating agent—that is, the hypochlorous acid or its reaction components—is preferably employed in excess; in most cases an excess up to 100%, preferably between 10 and 50%, of the amount of chlorinating agent stoichiometrically necessary to achieve the desired degree of chlorination should be used. The amount of the excess depends partly upon the concentration of the substituted biguanide in the acqueous solution, because the chlorinating agent must first reach a certain concentration before the chlorination reaction begins. For this reason it is recommended to carry out the reaction in as concentrated an aqueous solution or suspension as possible. It is preferred to employ solutions or suspensions containing from 10 to 60% by weight of substituted biguanide. If the biguanide is present in the form of a water-soluble salt, the reaction is preferably carried out at as high a concentration as possible, preferably in a 40 to 50% solution. In the case of less soluble biguanide salts—that is, if the biguanide salt is no longer completely soluble in water or only forms aqueous suspensions—it is preferred to use lower concentrations, for example solutions or suspensions containing from 20 to 25% by weight of biguanide compound. It must be emphasized, however, that the above-indicated values are only approximate values. When operating under industrial conditions, it is desirable to carry out the reaction at as high a concentration as possible, even if the biguanides being reacted with the hypochlorous acid are relatively insoluble biguanides. Thus, it is also possible to exceed the above-indicated concentrations if it is feasible in one or the other special case. The operation in concentrated solutions also facilitates the separation of the chlorinated reaction product from the reaction solution; sometimes the chlorobiguanides formed by the reaction spontaneously crystallize out of the solution, but sometimes it is advantageous to start the precipitation by placing a seed crystal of starting material into the solution. In some cases it is also possible to operate in somewhat more dilute solutions, even if the high solubility of the biguanides permits the operation in more concentrated solutions.

The precipitated chlorinated reaction product may be separated from the mother liquor by filtration and is subsequently dried, employing temperatures up to about 75° C. but preferably up to about 60° C. If the raw chlorinated reaction product is dried without first separating it from the mother liquor, it is recommended that the drying step be carried out at temperatures up to 30° C. in vacuo. After the substituted chlorobiguanides have been dried they are stable during storage and even after long periods of storage and undergo only a very small loss of active chlorine.

The new compounds may be used in any field where active chlorine is used, e.g. as disinfecting agents, as bleaching agents for natural or synthetic fibers, in oxidation processes and so on. The compounds are effective in alkaline, neutral and acid solutions.

The following examples will further illustrate the present invention and enable others skilled in the art to understand my invention more completely. I wish it to be understood, however, that the present invention is not limited to the particular compounds and conditions recited in these examples.

EXAMPLE I 100 gm. dimethylaminehydrochloride and 100 gm. technical grade dicyandiamide were intimately admixed with each other and fused in an open flask at 140° C., accompanied by frequent stirring. The temperature of the melt was held at 140° C. for about 1 hour and thereafter it was allowed to cool, and was admixed with 400 cc. water at 60 to 70° C. All of the solids dissolved after a short period of stirring. The solution was then cooled to 10° C. and a strong stream of chlorine gas was introduced into the solution. The solution gradually became acid, the pH-value varying between 5 and 3. As soon as the solution has assumed a weakly yellow color, the chlorination was terminated. Thereafter the solution was cooled to a temperature between −5 to 0° C. and a seed crystal of dimethylbiguanide was placed into the solution. After a relatively short time, 1,1-dimethyl-2-chlorobiguanide hydrochloride began to crystallize out in the form of crystalline needles. The crystalline precipitate was filtered off and dried at 60° C. Its available active chlorine content was 34.9%. The 1,1-dimethyl-2-chlorobiguanide hydrochloride melted at 75 to 78° C.

EXAMPLE II

The aqueous solution of the dicyandiamide-dimethylamine melt produced in accordance with Example I was chlorinated at a temperature between 10 and 20° C. until a thick crystalline precipitate suddenly formed. The pH-value of the solution was somewhere between 5 and 3. The precipitate was worked up as described in Example I. The active chlorine content of the crystalline product was 42 to 45%, which indicated that it was neither a monochloro-substituted dimethylbiguanide hydrochloride nor a dichloro-substituted dimethylbiguanide hydrochloride. It therefore had to be a mixture of both of these compounds.

EXAMPLE III

For the production of 1,1-dimethyl-2,4-dichlorobiguanide hydrochloride, the solution obtained in accordance with Example II together with the monochloro-substituted compounds precipitated therefrom were heated to a temperature between 18 and 20° C. The precipitated crystals again passed into solution without any loss in chlorine. The solution was now further chlorinated without control of the pH-value until a microcrystalline product precipitated at this temperature. This precipitate was then worked up as described in Example I. The active chlorine content of the crystalline product was 58 to 60%. The 1,1-dimethyl-2,4-dichlorobiguanide hydrochloride melted at 63° C. accompanied by an explosive ignition.

EXAMPLE IV 120 gm. diethylamine hydrochloride and 100 gm. dicyandiamide were reacted with each other as described in Example I. Since the 1,1-diethylbiguanide hydrochloride obtained thereby is more difficultly soluble in water than the corresponding dimethyl compound, the addition of 400 cc. water produced a thin slurry. This slurry was chlorinated with chlorine gas at 5 to 10° C. without control of the pH-value until it changed into a clear, weakly yellow solution. The solution was cooled to a temperature between −5 and 0° C. and thereafter lightly stirred with a glass rod, whereby 1,1-diethyl-2-chlorobiguanide hydrochloride was precipitated in the form of a fine crystalline powder. The active chlorine content of the dry powder was 30 to 32%, which indicated that the chlorinated compound was a monochloro-derivative. The 1,1-diethyl-2-chlorobiguanide hydrochloride melted at 162 to 167° C.

When the clear, weakly yellow solution above described was further chlorinated, a micro-crystalline precipitate suddenly formed after a short period of time. The active chlorine content of this micro-crystalline precipitate was 51 to 53% after drying, which indicated that the product was 1,1-diethyl-2,4-dichlorobiguanide hydrochloride. This dichloro-derivative melted at 103° C. accompanied by an explosive ignition.

EXAMPLE V 16 gm. of copper dicyandiamide and 30 gm. dimethylamine, dissolved in 100 cc. water, were heated in a closed tube for 25 hours at 120 to 125° C. After allowing the hot solution to cool, the red copper salt precipitate was filtered off on a vacuum filter, dissolved in 400 cc. water, and the copper was precipitated with hydrogen sulfide at 80 to 90° C. The filtrate was admixed with an excess of sulfuric acid and concentrated in vacuo. 1,1,5,5-tetramethylbiguanide sulfate remained as a crystalline residue. The product melted at 142° C., accompanied by decomposition.

10 gm. of this product were dissolved in 60 cc. water and a vigorous stream of chlorine gas was passed through the solution at 10° C., accompanied by vigorous stirring but without control of the pH-value. After 10 minutes the chlorination was complete. The weakly yellow solution was cooled to −5° C. The colorless crystals which precipitated were filtered off and dried at 50° C. in vacuo. The active chlorine content of 33% of the dried product indicated that the product was 1,1,5,5-tetramethyl-2-chlorobiguanide hydrochloride. This product melted at 111 to 114° C., accompanied by decomposition. When, instead of discontinuing the chlorination after 10 minutes, the above solution was further chlorinated at 18 to 20° C. until a crystalline precipitate was formed, 1,1,5,5-tetramethyl-2,4-dichlorobiguanide hydrochloride, having an active chlorine content of 51% and a melting point of 97 to 100° C. (vigorous decomposition), was formed.

Both the monochloro-substituted derivative and the dichloro-substituted derivatives were readily soluble in water and in alcohol.

EXAMPLE VI

Chlorine gas was introduced into a suspension of 100 gm. mercuric oxide in 1600 cc. water at 0 to 5° C., accompanied by stirring until the precipitate of unreacted mercuric oxide and the mercuric chloride reaction product were still barely yellow. 800 cc. of clear solution were separated from the suspension by filtration. The 4 to 5% aqueous hypochlorous acid solution thus obtained was cooled to 2° C. As soon as this temperature was reached, 50 gm. of 1,1-dimethylbiguanide hydrochloride were added to the solution in small portions over a period of 20 minutes. The temperature of the solution slowly increased to 18° C. Thereafter, the reaction mixture was stirred for an additional 15 minutes and the reaction vessel was placed into an ice-salt bath to bring about a more rapid cooling of the mixture. The temperature of the ice-salt bath was between −12 and −15° C. The chlorine addition product separated out in crystalline form after a short period of time. All of the above operations were carried out in the absence of light to prevent a decomposition of the hypochlorous acid. The yield of monochloro-substituted derivative, having an active chlorine content of 33.0%, was 21.5 gm. By carefully evaporating the water from the filtrate in vacuo at 35° C., additional 17 gm. of the monochloro-substituted derivative, having an active chlorine content of 27.3%, were obtained. For this purpose the filtrate was concentrated to a volume of about 100 cc. and thereafter cooled to 0° C. The crystals of the chlorination product precipitated from the solution after placing a seed crystal therein.

EXAMPLE VII

Raw hypochlorous acid produced in accordance with Example VI was distilled in a vacuum of 0.1 mm. mercury without exterior heating, at room temperature, and without separating the copper precipitate therefrom. The distillate was trapped in a vessel which was cooled to −20° C. When about one-third of the total volume of liquid had passed over, the distillation was discontinued and the residue was discarded. The solution of hypochlorous acid thus obtained contained about 24% HOCl. 500 cc. of this solution were gradually admixed over a period of 30 minutes and at a temperature between 0 and 2° C. with 80 gm. of 1,1-diethylbiguanide hydrochloride. The temperature rose during the mixing step and toward the end reached about 24° C. After about 30 minutes the solution was cooled to 0° C. as rapidly as possible by placing it into an ice-salt bath, and the crystals precipitated thereby were filtered off on a vacuum filter. The yield of monochloro-substituted derivative obtained thereby was 72 gm. It had an active chlorine content of 39.1%. By carefully distilling the water from the filter in vacuo and subsequent cooling of the residue, additional 13 gm. of monochloro-derivative with a 29% active chlorine content were obtained. All of these steps were carried out in the absence of light to prevent a decomposition of the hypochlorous acid.

The following table illustrates the improved water-solubility of chlorinated biguanide hydrochlorides over that of N,N'-dichloro-azodicarbon-diamidine.

Table

SOLUBILITIES OF THE HYDROCHLORIDE OF N,N'-DICHLORO-AZODICARBON-DIAMIDINE AND SUBSTITUTED BIGUANIDE DERIVATIVES CONTAINING ACTIVE CHLORINE

| Compound | Example | Solubility, gm. compound in 100 gm. water | | |
|---|---|---|---|---|
| | | at 20° C. | at 30° C. | at 40° C. |
| N,N'-dichloro-azodicarbon-diamidine hydrochloride | prior art | 0.08 | 0.10 | 0.10 |
| 1,1-dimethyl-2-chlorobiguanide hydrochloride | 1 | 17.5 | 26.0 | 37.0 |
| 1,1-dimethyl-2,4-dichlorobiguanide hydrochloride | 3 | 11.0 | 15.5 | 16.0 |
| 1,1-diethyl-2-chlorobiguanide hydrochloride | 4 | 11.2 | 14.0 | 21.4 |
| 1,1-diethyl-2,4-dichlorobiguanide hydrochloride | 4 | 7.9 | 8.4 | 14.6 |
| 1,1,5,5-tetramethyl-2-chlorobiguanide hydrochloride | 5 | 1.9 | 3.5 | 4.0 |
| 1,1,5,5-tetramethyl-2,4-dichlorobiguanide hydrochloride | 5 | 1.9 | 2.1 | 2.2 |

It should be pointed out that the solubility was determined by dispersing the chlorinated biguanide with 100 gm. water at the given temperature and thereafter determining the dissolved amount after 10 minutes of stirring. Consequently, the solubility values determined thereby reflect the additional factor of the rate of solubility; in other words, the solubility would be somewhat higher if in all cases the establishment of an equilibrium had been awaited.

Of course, the hydrochloride salts obtained by the methods described in the above examples may readily be converted into the corresponding free chlorinated biguanide compounds by neutralization with a suitable base.

EXAMPLE VIII

A mixture useful as a disinfecting agent for dishwashing, cleaning of bottles, milk-cans or other vessels or utensils used in the beverage and dairy industry has the following composition:

5 percent by weight 1,1-dimethyl-2-chloro-biguanide hydrochloride
35 percent by weight $Na_4P_2O_7$
10 percent by weight $Na_3P_5O_{10}$
15 percent by weight $Na_2O.3,3SiO_2$
5 percent by weight $C_{10-14}$-fatty alcohol sulfate
30 percent by weight water of crystallization The effectiveness of this agent against *Oospora lactis* was tested in an aqueous solution, containing 10 g./l. of this agent corresponding to a content of 175 mg./l. of active chlorine. At 20° C. all germs were killed after 2.5 minutes, and at 40° C. all germs were killed after 1 minute.

When replacing the 1,1-dimethyl-2-chloro-biguanide hydrochloride by other substituted biguanides with active chlorine, as they are described in the Examples II–VII, similar results were obtained.

This application is a continuation-in-part of my copending application, Serial No. 602,915, filed August 8, 1956, and now abandoned.

While I have illustrated certain specific embodiments of my invention, it will readily be apparent that the invention is not limited to these embodiments and that various changes and modifications may be made therein without departing from the spirit of the invention or the scope of the appended claims.

I claim:

1. Compounds selected from the group consisting of chlorinated N-substituted biguanides having the structural formula

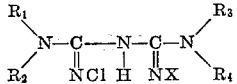

wherein $R_1$ is lower alkyl, $R_2$, $R_3$ and $R_4$ are selected from the group consisting of hydrogen and lower alkyl, and X is selected from the group consisting of hydrogen and chlorine, and their hydrochloride salts.

2. The hydrochloride salts of chlorinated N-substituted biguanides as in claim 1, wherein $R_1$ and $R_2$ are methyl and $R_3$ and $R_4$ are hydrogen, and X is hydrogen.

3. The hydrochloride salts of chlorinated N-substituted biguanides as in claim 1, wherein $R_1$ and $R_2$ are ethyl and $R_3$ and $R_4$ are hydrogen, and X is hydrogen.

4. The hydrochloride salts of chlorinated N-substituted biguanides as in claim 1, wherein $R_1$ and $R_2$ are methyl and $R_3$ and $R_4$ are hydrogen, and X is chlorine.

5. The hydrochloride salts of chlorinated N-substituted biguanides as in claim 1, wherein $R_1$, $R_2$, $R_3$ and $R_4$ are methyl, and X is hydrogen.

6. The hydrochloride salts of chlorinated N-substituted biguanides as in claim 1, wherein $R_1$ and $R_2$ are ethyl and $R_3$ and $R_4$ are hydrogen, and X is chlorine.

7. The process of producing compounds selected from the group consisting of chlorinated N-substituted biguanides having the structural formula

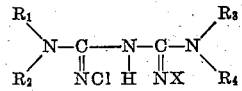

wherein $R_1$ is lower alkyl, $R_2$, $R_3$ and $R_4$ are selected from the group consisting of hydrogen and lower alkyl, and X is selected from the group consisting of hydrogen and chlorine, and their hydrochloride salts, which comprises subjecting a compound selected from the group consisting of compounds having the structural formula

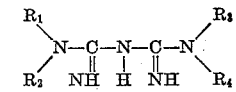

wherein $R_1$, $R_2$, $R_3$ and $R_4$ have the above-indicated meaning, and their hydrochloride salts to a chlorination reaction with a stoichiometrically excess amount of hypochlorus acid at a pH of between about 3 and about 5 at temperatures ranging from about 0° C. to about 30° C. and in the presence of substantial amounts of water, and separating the chlorinated reaction product from the reaction mixture.

8. The process of producing the hydrochloride salts of chlorinated N-substituted biguanides having the structural formula

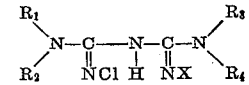

wherein $R_1$ is lower alkyl, $R_2$, $R_3$ and $R_4$ are selected from the group consisting of hydrogen and lower alkyl, and X is selected from the group consisting of hydrogen and chlorine, which comprises subjecting the hydrochloride salt of a compound having the structural formula

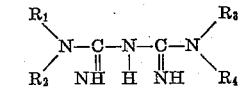

wherein $R_1$, $R_2$, $R_3$ and $R_4$ have the above-indicated meaning, to a chlorination reaction with a stoichiometrically excess amount of hypochlorous acid at a pH of 3 to 5, at temperatures ranging from about 0° C. to about 30° C. and in the presence of substantial amounts of water, and separating the chlorinated reaction product from the reaction mixture.

9. The process of producing the hydrochloride salt of chlorinated N-substituted biguanides as in claim 8, wherein the hypochlorous acid necessary for the reaction is produced in situ by introducing gaseous chlorine into the aqueous reaction mixture.

10. The hydrochloride salts of chlorinated N-substituted biguanides as in claim 1, wherein $R_1$, $R_2$, $R_3$ and $R_4$ are methyl, and X is chlorine.

No references cited.